United States Patent
Unger

(10) Patent No.: US 11,981,175 B2
(45) Date of Patent: May 14, 2024

(54) METHOD FOR OPERATING A CHASSIS OF A MOTOR VEHICLE, AND MOTOR VEHICLE

(71) Applicant: AUDI AG, Ingolstadt (DE)

(72) Inventor: Andreas Unger, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/973,766

(22) Filed: Oct. 26, 2022

(65) Prior Publication Data

US 2023/0141704 A1    May 11, 2023

(30) Foreign Application Priority Data

Nov. 11, 2021 (DE) .......................... 102021129355.3

(51) Int. Cl.
*B60G 17/0165* (2006.01)
*B60G 17/08* (2006.01)

(52) U.S. Cl.
CPC ......... *B60G 17/0165* (2013.01); *B60G 17/08* (2013.01); *B60G 2400/821* (2013.01); *B60G 2500/10* (2013.01)

(58) Field of Classification Search
CPC .............. B60G 17/0165; B60G 17/08; B60G 2400/821; B60G 2500/10
See application file for complete search history.

(56) References Cited

U.S. PATENT DOCUMENTS

| 5,276,622 | A | 1/1994 | Miller et al. |
| 5,382,045 | A | 1/1995 | Takeda et al. |
| 5,522,482 | A | 6/1996 | Kashiwagi et al. |
| 6,321,887 | B1 * | 11/2001 | Kurusu .................. B60G 17/08 188/266.2 |
| 9,061,561 | B2 * | 6/2015 | Kikuchi ................ B60W 10/22 |

(Continued)

FOREIGN PATENT DOCUMENTS

| DE | 10120918 A1 | 10/2002 |
| DE | 102013018927 A1 | 5/2015 |

(Continued)

OTHER PUBLICATIONS

Examination Report issued on Jun. 15, 2022, in connection with corresponding German Application No. 102021129355.3 (8 pp., including machine-generated English translation).

(Continued)

*Primary Examiner* — Toan C To
(74) *Attorney, Agent, or Firm* — Maier & Maier, PLLC

(57) ABSTRACT

A method for operating a chassis of a motor vehicle according to the principle of a skyhook control, the chassis having at least one adjustable damper according to which body movements of the motor vehicle body resulting from road bumps are damped using the skyhook damping value ($d_{sky}$). When driving over a road bump, a classification is made as to whether a critical body movement of the motor vehicle body is to be expected, and that in case of a classification as a critical body movement, the critical classified body movement is compensated for using a stored critical skyhook damping value ($d_{sky\text{-}crit}$) which is greater than the skyhook damping value ($d_{sky}$).

11 Claims, 2 Drawing Sheets

(56) References Cited

U.S. PATENT DOCUMENTS

| | | | | |
|---|---|---|---|---|
| 9,452,653 | B2* | 9/2016 | Kikuchi | B60W 30/025 |
| 9,963,006 | B2* | 5/2018 | Kubota | B60G 17/0165 |
| 2002/0116104 | A1* | 8/2002 | Kawashima | B60G 7/006 |
| | | | | 280/5.515 |
| 2007/0029711 | A1* | 2/2007 | Ehara | B60G 17/08 |
| | | | | 267/64.28 |
| 2008/0140285 | A1* | 6/2008 | Sekiya | B60G 17/018 |
| | | | | 701/38 |
| 2009/0043452 | A1* | 2/2009 | Sekiya | F16F 9/535 |
| | | | | 701/40 |
| 2009/0248247 | A1* | 10/2009 | Furuichi | B60G 17/016 |
| | | | | 701/37 |
| 2013/0245888 | A1* | 9/2013 | Kikuchi | B60G 17/06 |
| | | | | 701/38 |
| 2014/0358371 | A1* | 12/2014 | Kikuchi | B60W 10/18 |
| | | | | 701/37 |
| 2015/0046035 | A1* | 2/2015 | Kikuchi | B60G 17/0195 |
| | | | | 701/37 |
| 2015/0066295 | A1* | 3/2015 | Kanda | B60G 17/01933 |
| | | | | 701/38 |
| 2015/0290995 | A1* | 10/2015 | Kanda | B60G 17/0182 |
| | | | | 701/37 |
| 2016/0288608 | A1* | 10/2016 | Göhrle | B60G 17/018 |
| 2016/0318364 | A1* | 11/2016 | Kanda | B60G 17/08 |
| 2017/0174034 | A1* | 6/2017 | Liu | B60G 17/08 |
| 2018/0156303 | A1* | 6/2018 | Toyohira | B60G 17/02 |
| 2018/0297434 | A1* | 10/2018 | Ohno | B60G 17/02 |
| 2019/0232748 | A1 | 8/2019 | Mohamed et al. | |
| 2019/0359203 | A1* | 11/2019 | Isshiki | B60W 30/02 |
| 2019/0359250 | A1* | 11/2019 | Isshiki | B62D 5/0463 |
| 2020/0023705 | A1* | 1/2020 | Hirao | B60G 17/0182 |
| 2020/0198431 | A1* | 6/2020 | Isshiki | B60G 17/018 |
| 2021/0283972 | A1* | 9/2021 | Coerman | B60G 17/0165 |
| 2021/0291606 | A1* | 9/2021 | Kanda | B60G 17/06 |
| 2021/0354523 | A1* | 11/2021 | Hirao | F16F 15/02 |
| 2023/0141330 | A1* | 5/2023 | Konada | B60G 17/0165 |
| | | | | 280/5.514 |

FOREIGN PATENT DOCUMENTS

| | | |
|---|---|---|
| DE | 102019206898 A1 | 11/2020 |
| DE | 102020007770 A1 | 3/2021 |

OTHER PUBLICATIONS

Extended European Search Report issued on Feb. 7, 2023, in corresponding European Application No. 22201417.7, 24 pages.

* cited by examiner

METHOD FOR OPERATING A CHASSIS OF A MOTOR VEHICLE, AND MOTOR VEHICLE

FIELD

The invention relates to a method for operating a chassis of a motor vehicle, and a motor vehicle.

BACKGROUND

Active chassis systems, in which active forces can be generated in the wheel suspension via force-introducing elements in the suspension or damping system, are well known from the prior art.

One function of these chassis systems is to compensate for larger bumps such as speed breakers or road variations. For this purpose, signals from a forward-looking sensor system, such as, for example, a camera directed at the road, are used. A height profile of the bumps ahead of the motor vehicle can be created via a suitable analysis of the sensor signals or the camera images. Thanks to this anticipation, it is now possible to send corresponding control signals to the chassis actuators before driving over the bumps, in order to guide the wheels over the bumps so that the vehicle body ideally no longer moves. In this regard, reference is made to DE 10 2020 007 770 A1 merely as an example. A well-known problem with this type of chassis systems is that determining the road height profile using a forward-looking sensor system, such as, for example, a camera, is very complex. Large amounts of data are created that have to be sent between different control units on the bus systems of the motor vehicle. In addition, the analysis of the sensor data, in particular the analysis of the optical images from the camera, is subject to errors: for example, if the view of the road is restricted, the height profile can no longer be determined precisely, with the result that the active chassis system "incorrectly" responds due to the data error, which in turn can lead to a body movement of the motor vehicle body being generated instead of being reduced.

An alternative way of compensating for larger bumps, such as speed breakers or road variations, is based on the principle of the so-called skyhook control. For this purpose, the body movement of the motor vehicle body is measured using an inertial sensor system (angular rates, accelerations) and control signals are determined, which counteract the body movement. For prior art with regard to the skyhook control, reference is made, for example, to DE 101 20 918 A1.

As is well known, the skyhook approach is based on the theoretical consideration that a motor vehicle body that rolls over a road via a wheel can remain at rest if the motor vehicle body is connected to an inertial reference system, e.g. the sky, via a so-called skyhook damper, cf. FIG. 1. Since the imaginary arrangement of the skyhook damper above the vehicle body is impossible to implement, an adjustable damper is controlled accordingly in such a way that body movements of the motor vehicle body resulting from bumps in the road are damped, i.e. the "skyhook" effect is simulated.

The crucial influencing parameter for the damping is the damping value of the skyhook damper, also referred to below as the skyhook damping value $d_{sky}$, since this value indicates how strongly the body movement of the motor vehicle body is to be damped.

That is to say—if a correspondingly high skyhook damping value $d_{sky}$ is provided for damping body movements of the motor vehicle body resulting from bumps in the road—it is possible in principle, similar to a forward-looking sensor system, to limit the body movement of the motor vehicle when driving over a speed breaker, for example, to a minimum. However, this proves to be impractical since the high skyhook damping values $d_{sky}$ required in this case, lead to a noticeable deterioration in driving comfort, cf. FIG. 2.

SUMMARY

It is the object of the invention to develop a method for operating a chassis of a motor vehicle according to the principle of skyhook control in such a way that, in addition to a high level of driving comfort, even when driving over major bumps in the road, such as speed breakers or road variations, there is sufficient damping of the body movement of the motor vehicle body.

According to the method for operating a chassis of a motor vehicle, the chassis comprises at least one adjustable damper, and the body movement of the motor vehicle body resulting from bumps in the road are damped in a known manner using the skyhook damping value $d_{sky}$.

According to the invention, it is now provided that when driving over a bump in the road, a classification is made as to whether a critical body movement of the motor vehicle body is to be expected as a result of driving over the bump in the road, and that in the event of a classification as a critical body movement, the body movement classified as critical is compensated for by using a stored skyhook damping value, which in relation to the "normal" damping value $d_{sky}$ increased, hereinafter referred to as the critical skyhook damping value $d_{sky\text{-}crit}$.

In other words, the skyhook damping value $d_{sky}$ is selectively raised to the critical skyhook damping value $d_{sky\text{-}crit}$ only for driving over a relevant bump, so that only a temporary deterioration in driving comfort occurs. Due to the significantly improved damping when driving over bumps and the associated significantly improved driving experience, this merely temporary deterioration in driving comfort resulting from the temporary raise to the critical skyhook damping value $d_{sky\text{-}crit}$ is almost not noticed or is not perceived at all disturbing.

Merely for the sake of completeness, it should be noted that the critical skyhook damping value $d_{sky\text{-}crit}$ used for the damping of body movements classified as critical is significantly greater than the "normal" skyhook damping value $d_{sky}$ used for the damping of body movements not classified as critical, i.e. "normal" body movements. Significantly larger is to be understood in particular in the sense that the critical skyhook damping value $d_{sky\text{-}crit}$ is greater than the "normal" skyhook damping value $d_{sky}$ by a factor of at least 2.

Advantageously, the method according to the invention thus enables a comparable reduction in the body movement when driving over larger bumps, such as, for example, speed breakers, like a forward-looking sensor system.

It is also advantageous that the skyhook control used according to the method is very robust and significantly less complex compared to the concept of forward-looking sensor systems, since the complex data processing of the sensor signals, in particular the camera signals, is no longer necessary. In addition, there can now no longer be erroneous activation of the chassis due to incorrectly identified road height profiles. I.e., although no forward-looking sensor system is utilized, the driver experiences a comparable experience when driving over larger bumps in the road, such as speed breakers or road variations.

In this case, the stored critical skyhook damping value $d_{sky\text{-}crit}$ is preferably chosen such that the skyhook damping value $d_{sky\text{-}crit} \geq 4000$ Ns/m. Setting the skyhook damping value $d_{sky\text{-}crit}$ to $\geq 4000$ Ns/m ensures sufficiently high damping to effectively damp a body movement of the motor vehicle body that is classified as critical.

A skyhook damping value $d_{sky\text{-}crit} = 5000$ Ns/m or $\geq 5000$ Ns/m is particularly preferred. As initial tests have shown, effective damping of the vehicle body is guaranteed starting at a skyhook damping value $d_{sky\text{-}crit} = 5000$, even when driving over larger bumps.

The required classification, namely whether a critical body movement of the motor vehicle body is to be expected as a result of driving over the bumps in the road, is carried out according to the invention by measuring the spring deflections that occur in a first step and determining the resulting spring speeds from the measured spring deflections by differentiating.

Determining the spring speed by taking the derivative of the spring deflection data has proven to be advantageous, since spring deflection sensors are usually installed as standard in today's motor vehicles, so that the necessary spring speeds can be determined easily and cost-effectively.

Since the measured spring deflections and thus also the spring speeds determined therefrom consist of superimposed vibrations, which mainly contain components of the body movement and wheel movement, and only an excitation in the range of the body frequency can lead to a large and therefore critical body movement of the motor vehicle body, in a next step, the signal components of the body frequency are extracted from the spring speeds using a low-pass filter.

Since the direction of the excitation is not important, the absolute values are determined from the filtered spring speeds in a next step.

The absolute values of the filtered spring speeds are then compared with a stored lower limit speed.

The stored lower limit speed is a speed determined by calculation or by testing, and if it is exceeded, it can be assumed that the vehicle body will experience an excitation that will lead to a critical body movement.

If the comparison now shows that the absolute value of a filtered spring speed exceeds the stored lower limit speed, the body movement to be expected is classified as a critical body movement of the motor vehicle body and a corresponding control signal is generated to set a damper force to be set via the adjustable damper to reduce the development movement classified as critical.

Since the skyhook damping is increased when the stored lower limit speed is exceeded, the body movement is already damped before it is fully developed.

In order to ensure a "smooth" transition between the normal skyhook damping and the increased skyhook damping, according to a particularly preferred embodiment, the absolute value of the filtered spring speeds is also compared with a stored upper limit speed, and the control signal is
- set to the value of 1 if the absolute value of the filtered spring speed is $\geq$ the stored upper limit speed,
- set to the value of 0 if the absolute value of the filtered spring speed is $\leq$ the stored lower limit speed, and
- interpolated if the stored lower limit speed < the absolute value of the filtered spring speed < the stored upper limit speed.

In order to damp the entire oscillation period of the motor vehicle body, a further preferred embodiment provides that the control signal for setting the increased skyhook damping and thus for reducing the critical body movement is maintained for a stored period of time. According to the method, this can be implemented in a simple manner by means of a corresponding holding element. It is a further object of the invention to develop a motor vehicle which comprises a chassis, according to which the wheels of the motor vehicle are each mounted on the motor vehicle body via a wheel suspension having an adjustable damper, and a regulating/control unit which regulates the adjustable dampers, in such a way that with a high level of driving comfort, even when driving over larger bumps in the road, such as, for example, speed breakers or road variations, sufficient damping of the body movement of the motor vehicle body is ensured.

This object is achieved in that the adjustable dampers of the chassis of the motor vehicle are operated according to any one of claims 1 to 5 and the regulation/control unit is set up to carry out a method according to any one of claims 1 to 5.

All of the statements relating to the method according to the invention for operating a chassis of a motor vehicle can be transferred analogously to the motor vehicle according to the invention, so that the aforementioned advantages are also achieved with said motor vehicle.

BRIEF DESCRIPTION OF THE FIGURES

Further advantages and possible applications of the invention result from the following description in connection with the figures.

DETAILED DESCRIPTION

Figure 1:
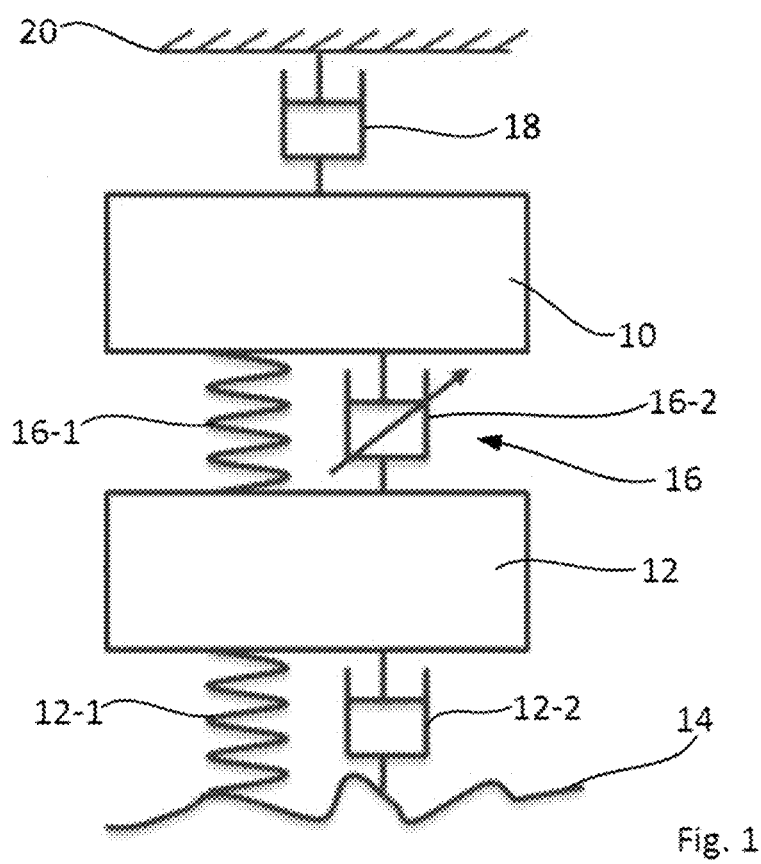
FIG. 1 shows a schematic representation of the skyhook principle.

FIG. 1 shows a schematic representation of a motor vehicle body 10 which rolls over a road 14 via a wheel 12. Between motor vehicle body 10 and wheel 12, a chassis 16 is arranged in a known manner, which comprises an adjustable damper 16-2 in addition to a suspension spring 16-1.

The spring/damper properties of the wheel 12 when rolling on the road 14 are taken into account by the tire spring designated with the reference numeral 12-1 and the tire damper designated with the reference numeral 12-2.

As is known, the skyhook principle or the skyhook approach is based on the theoretical consideration that the motor vehicle body 10, which rolls over the road 14 via the wheel 12, can remain at rest if the motor vehicle body 10 is connected to an inertial reference system 20, e. g. sky, via a so-called skyhook damper 18. Since the imaginary arrangement of the skyhook damper 18 above the vehicle body 10 is impossible to implement, the adjustable damper 16-2 is controlled accordingly in such a way that body movements of the motor vehicle body 10 resulting from bumps in the road are damped, i.e. the "skyhook" effect is simulated.

The crucial influencing parameter is the so-called skyhook damping value $d_{sky}$, since this values indicates how strongly the body movement of the motor vehicle body 10 is to be damped.

Figure 2:
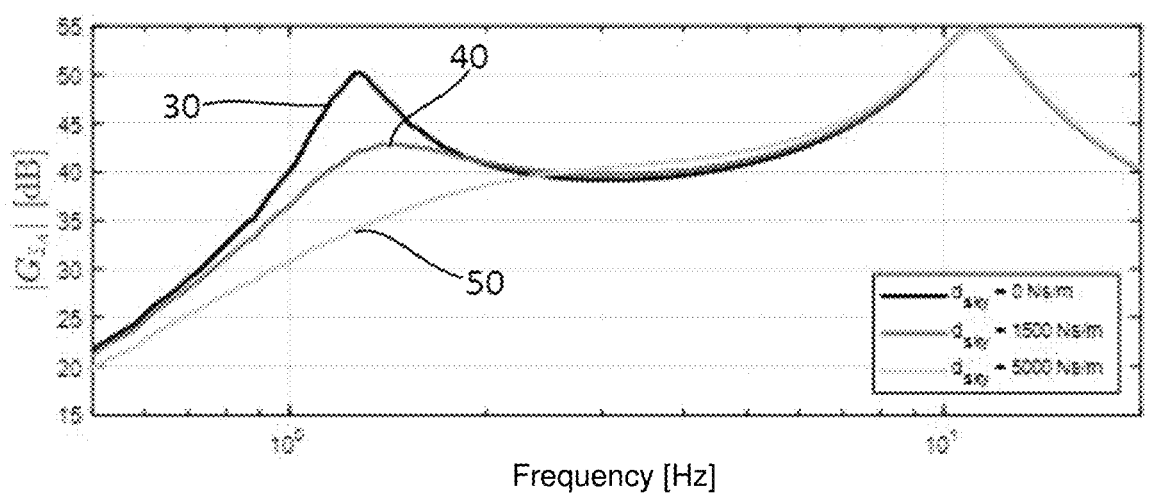
FIG. 2 shows a graphical representation of the effect of the skyhook damping value on body acceleration.

The influence of the skyhook damping value $d_{sky}$ on the accelerations of the motor vehicle body 10 resulting from driving over bumps in the road can be seen in FIG. 2, in which the amplitude of the body acceleration against frequency is shown. The natural frequency of the motor vehicle body 10 at approximately 1.3 Hz and the natural frequency of the wheel 12 at approximately 11 Hz can be clearly seen.

Reference numeral 30 designates the unregulated curve, i.e. skyhook damping value $d_{sky}$=0 Ns/m, reference numeral 40 designates the curve with a skyhook damping value $d_{sky}$=1500 Ns/m, and reference numeral 50 designates the curve with a skyhook damping value $d_{sky}$=5000 Ns/m.

Here, as can be seen from FIG. 2, the unregulated curve 30 shows clear vibration amplitudes in the range of the natural frequency of the motor vehicle body 10. These vibration amplitudes can be greatly reduced if the skyhook damping value $d_{sky}$ is increased, cf. curve 40 with $d_{sky}$=1500 Ns/m and curve 50 with $d_{sky}$=5000 Ns/m. It can also be seen that with high skyhook damping, cf. curve 50 with $d_{sky}$=5000 Ns/m, the amplitudes in the isolation area also increase, approximately 3 Hz to 8 Hz, which in turn means a deterioration in driving comfort.

Figure 3:
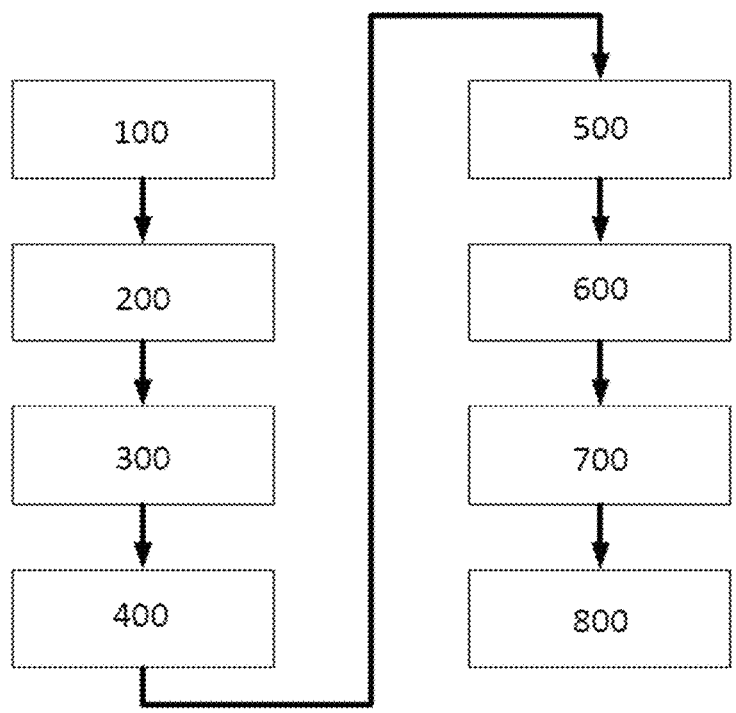
FIG. 3 shows a schematic flowchart of the method.

As can be seen from FIG. 3, it is provided according to the invention that in a first step 100 the occurring spring deflections are measured via spring deflection sensors installed in the motor vehicle.

The spring speeds are determined in step 200 by taking the derivative of the measured spring deflections.

Figure 4A:
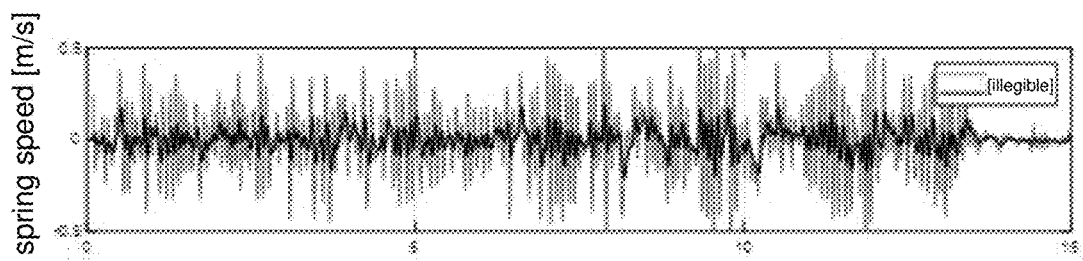
FIG. 4a shows the determined spring speeds plotted against time.

Here, the determined spring speeds comprise in particular signal components resulting from the movement of the motor vehicle body 10 and the movement of the wheel 12, cf. FIG. 4a, signals shown in a narrow line.

Since only an excitation in the range of the natural frequency of the motor vehicle body 10 can lead to a large and thus relevant body movement, in step 300 the signal components of the body frequency are extracted from the spring speeds via a low-pass filter, cf., FIG. 4a, signals shown in bold line. Since the direction of the excitation is not important, in step 400 the filtered spring speeds are considered as absolute values, cf. FIG. 4b.

Since several spring deflection sensors are generally installed in the motor vehicle, the maximum value is selected in step 500. If said maximum value exceeds a fixed lower limit speed, cf. FIG. 4b, dash-dotted line, the classification is classified as critical, which is to be damped accordingly with the critical skyhook damping value $d_{sky\text{-}crit}$.

Figure 4B:
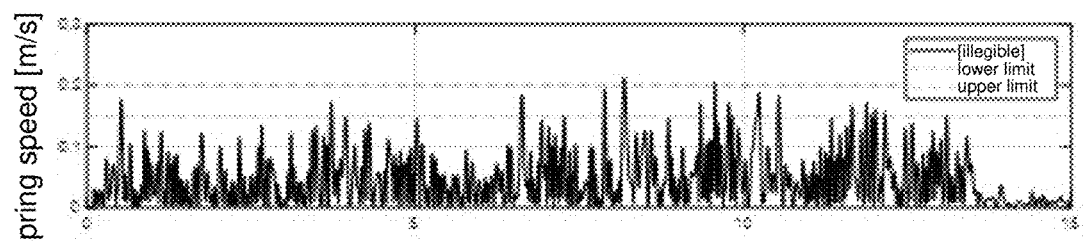
FIG. 4b shows the filtered spring speeds from FIG. 4a as absolute values plotted against time.

For a smooth transition between the "normal" skyhook damping with the "normal" skyhook damping value $d_{sky}$ and the related increased skyhook damping with the critical skyhook damping value $d_{sky\text{-}crit}$, there is an interpolation in step 600 between the lower speed limit and a fixed upper limit speed, cf. FIG. 4b, dashed line, i.e. the signal for increasing the skyhook damping is 0 if the unfiltered, absolute spring speed is equal to or below the lower limit speed and 1 if the filtered, absolute spring speed is equal to or above the upper limit speed, cf. FIG. 4c.

Since, when the lower speed limit is exceeded, it can be assumed that the motor vehicle body 10 is experiencing an excitation that leads to significant body vibration and the skyhook damping is already increased when the lower speed limit is exceeded, cf. step 800, the body movement is already damped before it is fully developed.

Figure 4C:
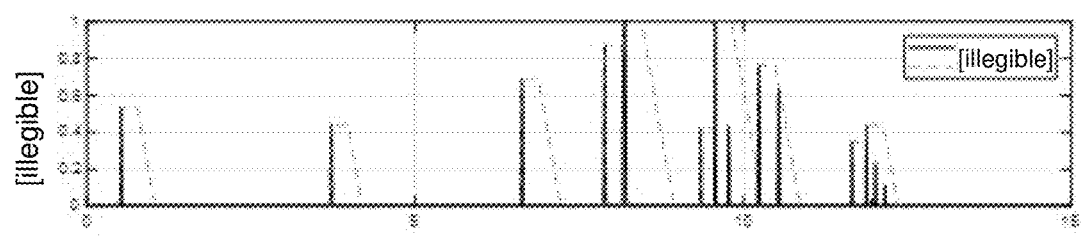
FIG. 4c shows the resulting control signal.

In order to damp the entire oscillation period of the motor vehicle body 10, the increased skyhook damping is maintained for a time to be set, cf. FIG. 4c, dashed line. This is implemented in step 700 by means of a corresponding holding element.

The invention claimed is:

1. A method for operating a chassis of a motor vehicle according to the principle of a skyhook control, the chassis having at least one adjustable damper according to which body movements of the motor vehicle body resulting from road bumps are damped using the skyhook damping value ($d_{sky}$), the method comprising:
   when driving over a road bump, a classification is made as to whether a critical body movement of the motor vehicle body is to be expected, wherein, in the event of a classification as a critical body movement, the body movement classified as critical is compensated for by using a stored critical skyhook damping value ($d_{sky\text{-}crit}$) which is greater than the skyhook damping value ($d_{sky}$).

2. The method according to claim 1, wherein the following applies to the stored critical skyhook damping value ($d_{sky\text{-}crit}$):

critical skyhook damping value $(d_{sky\text{-}crit}) \geq 4000$ Ns/m.

3. The method according to claim 1, wherein the classification is carried out by:
   determining measured spring deflections by measuring spring deflections that occur;
   determining spring speeds resulting from the measured spring deflections;
   determining a plurality of filtered spring speeds by filtering the spring speeds in a low-pass filter, comprising determining an absolute value of each of the plurality of filtered spring speeds and comparing the absolute value of each of the plurality of filtered spring speeds with a stored lower limit speed,
   wherein, for a filtered spring speed in the plurality of filtered spring speeds, if the absolute value of the filtered spring speed is greater than the stored lower limit speed, the body movement to be expected is classified as a critical body movement of the motor vehicle body, and a control signal for reducing the critical body movement is generated.

4. The method according to claim 3, wherein the absolute value of each of the plurality of filtered spring speeds is also compared with a stored upper limit speed, wherein, for the filtered spring speed in the plurality of filtered spring speeds, if the absolute value of the filtered spring speed is ≥the stored upper limit speed, the control signal is set to a value of 1; if the absolute value of the filtered spring speed is ≤the stored lower limit speed, the control signal is set to a value of 0; and if the stored lower speed limit is <the absolute value of the filtered spring speed<the stored upper limit speed, a value of the control signal is determined by interpolation.

5. The method according to claim 4, wherein the control signal for reducing the critical body movement is maintained for a stored period of time.

6. A motor vehicle, comprising a chassis according to which the wheels of the motor vehicle are each mounted on the motor vehicle body via a wheel suspension having an adjustable damper, and a regulation/control unit for regulating/controlling the adjustable dampers, wherein the adjustable dampers are operated such that when driving over a road bump, a classification is made as to whether a critical body movement of the motor vehicle body is to be expected, wherein, in the event of a classification as a critical body movement, the body movement classified as critical is compensated for by using a stored critical skyhook damping value ($d_{sky\text{-}crit}$) which is greater than the skyhook damping value ($d_{sky}$).

7. The motor vehicle according to claim 6, wherein the regulation/control unit is set up to carry out the classification.

8. The motor vehicle according to claim 6, wherein the following applies to the stored critical skyhook damping value ($d_{sky\text{-}crit}$):

critical skyhook damping value ($d_{sky\text{-}crit}$)≥4000 Ns/m.

9. The motor vehicle according to claim 6, wherein the classification is carried out by:
  determining measured spring deflections by measuring spring deflections that occur;
  determining spring speeds resulting from the measured spring deflections;
  determining a plurality of filtered spring speeds by filtering the spring speeds in a low-pass filter, comprising determining an absolute value of each of the plurality of filtered spring speeds and comparing the absolute value of each of the plurality of filtered spring speeds with a stored lower limit speed,
  wherein, for a filtered spring speed in the plurality of filtered spring speeds, if the absolute value of the filtered spring speed is greater than the stored lower limit speed, the body movement to be expected is classified as a critical body movement of the motor vehicle body, and a control signal for reducing the critical body movement is generated.

10. The motor vehicle according to claim 9, wherein the absolute value of each of the plurality of filtered spring speeds is also compared with a stored upper limit speed, wherein, for the filtered spring speed in the plurality of filtered spring speeds, if the absolute value of the filtered spring speed is ≥the stored upper limit speed, the control signal is set to a value of 1; if the absolute value of the filtered spring speed is ≤the stored lower limit speed, the control signal is set to a value of 0; and if the stored lower speed limit is <the absolute value of the filtered spring speed<the stored upper limit speed, a value of the control signal is determined by interpolation.

11. The motor vehicle according to claim 10, wherein the control signal for reducing the critical body movement is maintained for a stored period of time.

* * * * *